United States Patent
Burks

(10) Patent No.: US 12,354,420 B2
(45) Date of Patent: Jul. 8, 2025

(54) SYSTEMS AND METHODS FOR AN AUTOMOBILE STATUS RECORDER

(71) Applicant: Kennith Burks, Anaheim, CA (US)

(72) Inventor: Kennith Burks, Anaheim, CA (US)

(73) Assignee: Kennith Burks, Anaheim, CA (US)

(*) Notice: Subject to any disclaimer, the term of this patent is extended or adjusted under 35 U.S.C. 154(b) by 249 days.

(21) Appl. No.: 17/338,101

(22) Filed: Jun. 3, 2021

(65) Prior Publication Data

US 2022/0051493 A1 Feb. 17, 2022

Related U.S. Application Data

(60) Provisional application No. 63/065,502, filed on Aug. 14, 2020.

(51) Int. Cl.
*G07C 5/08* (2006.01)
*B60W 50/14* (2020.01)
*H04W 4/029* (2018.01)

(52) U.S. Cl.
CPC ............ *G07C 5/0841* (2013.01); *B60W 50/14* (2013.01); *G07C 5/0808* (2013.01); *H04W 4/029* (2018.02); *B60W 2050/143* (2013.01)

(58) Field of Classification Search
CPC .... G07C 5/0841; G07C 5/0808; G07C 5/008; G07C 5/085; B60W 50/14; B60W 2050/143; H04W 4/029
See application file for complete search history.

(56) References Cited

U.S. PATENT DOCUMENTS

| | | | |
|---|---|---|---|
| 2015/0186991 A1* | 7/2015 | Meyer | G06Q 40/02 705/35 |
| 2015/0339928 A1* | 11/2015 | Ramanujam | G08G 1/202 701/23 |
| 2016/0332589 A1* | 11/2016 | Van Wiemeersch | G07C 5/0816 |
| 2017/0066453 A1* | 3/2017 | Hunt | B60W 30/143 |
| 2017/0076514 A1* | 3/2017 | Valeri | G05B 23/00 |
| 2018/0225974 A1* | 8/2018 | Molin | G07C 5/008 |
| 2018/0297518 A1* | 10/2018 | Armitage | G07C 5/008 |
| 2019/0270484 A1* | 9/2019 | Youn | B62D 15/0245 |
| 2019/0271980 A1* | 9/2019 | Kaji | G05D 1/0223 |
| 2020/0172111 A1* | 6/2020 | Hamagami | G06V 40/174 |
| 2020/0225343 A1* | 7/2020 | Lee | G01S 7/003 |
| 2021/0402942 A1* | 12/2021 | Torabi | G06V 10/82 |
| 2022/0009447 A1* | 1/2022 | Kleve | H04W 4/029 |
| 2022/0032942 A1* | 2/2022 | Takei | G06V 20/597 |

* cited by examiner

*Primary Examiner* — James J Lee
*Assistant Examiner* — Alexander George Matta
(74) *Attorney, Agent, or Firm* — Kumar Maheshwari; Mahesh Law Group PC

(57) ABSTRACT

Systems and methods for recording statuses of an automobile are presented. A method for implementing an automobile status recorder includes collecting, with one or more sensors, one or more statuses of a vehicle. The method includes creating a time field for each of the one or more statuses. The method includes storing the one or more statuses in a storage that is configured to retrieve statuses based on a time range. The method includes generating a notification when the one or more statuses meet a condition and transmitting the notification to the mobile device.

19 Claims, 11 Drawing Sheets

SYSTEMS AND METHODS FOR AN AUTOMOBILE STATUS RECORDER

CROSS-REFERENCE TO RELATED APPLICATIONS

This application claims the benefit of U.S. Provisional Application No. 63/065,502 titled "SYSTEMS AND METHODS FOR AN AUTOMOBILE STATUS RECORDER" which was filed on Aug. 14, 2020 and is incorporated by reference in its entirety.

FIELD OF THE INVENTION

This disclosure relates to the fields of vehicle safety and vehicle tracking.

BACKGROUND

Devices, such as GPS and vehicle trackers are used to record vehicle data. However, they are somewhat limited. Vehicle data, such as the speed that a vehicle was travelling at a time and place, is often not readily accessible. The data may not be recorded; or if the data is recorded, it may not be easily retrievable. Unfortunately, the data, which could be useful to show the cause of vehicle accidents, often cannot be used as such. And despite the prevalence of such vehicle accidents and the increasing use of digital technology, eyewitness statements are still primarily used to determine the cause of vehicle accidents. There is a need for an easy-to-use system of retrieving data of a vehicle based on the time and place of operation. Further, there is a need for a system of retrieving data that incorporates functions of mobile devices such as notifications and GPS.

SUMMARY

The current invention is a method and system of recording status information in a vehicle. A general aspect is a method for implementing an automobile status recorder. The method includes collecting, with one or more sensors, one or more statuses, of a vehicle and creating a time field for each of the one or more statuses. The method includes storing the one or more statuses in a storage that is configured to retrieve statuses based on a time range. The method includes generating a notification when the one or more statuses meet a condition and transmitting the notification to the mobile device. The method may further include receiving from the mobile device a transmission that sets a threshold for the condition. The method may further include transmitting to the mobile device a signal to establish a communication responsive to the notification. The one or more statuses may include a global positioning system (GPS) location of the vehicle where the condition includes a location of the vehicle. The method may further include receiving a GPS location of the mobile device where the condition includes a relationship between the location of the vehicle and the location of the mobile device. The relationship between the location of the vehicle and the location of the mobile device may further include a geographic area. The method may further include receiving a selection from the mobile device of the geographic area where the condition comprises a relationship between the geographic area and the location of the vehicle. The relationship between the location of the vehicle and the location of the mobile device may include a proximity. The selection may include a vector that specifies a direction and distance of the mobile device to the vehicle where the relationship between the location of the vehicle and the location of the mobile device comprises a distance from the vehicle to the mobile device in the direction. The method may further include receiving from the mobile device a selection of a condition where the condition sets separate thresholds for inside the geographic area and outside the geographic area. The method may further include receiving a selection of one or more statuses from the mobile device where the notification comprises the selection of the one or more statuses.

Another general aspect is an automobile status recorder. The automobile status recorder includes one or more sensors, in a vehicle, that are configured to continually record one or more statuses of the vehicle and a storage that is configured to store the one or more statuses. The automobile status recorder includes a computer that is configured to retrieve one or more recorded statuses based on a time range where the computer is configured to generate a notification when the one or more statuses meet a condition. The computer is configured to transmit the notification to a mobile device. The computer may be configured to receive a selection from the mobile device where the selection comprises one or more thresholds to meet the condition. The one or more statuses may include a global positioning system (GPS) location of the vehicle where the one or more thresholds comprise one or more location selections to the GPS location. The one or more location selection may include a geographic area. The one or more thresholds may include at least one of a speed, an acceleration, or a braking.

An exemplary embodiment is a computer readable storage medium having data stored therein representing a software executable by a computer, the software comprising instructions that, when executed, cause the computer to perform collecting, with one or more sensors, one or more statuses, of a vehicle. The instructions further cause the computer to perform storing the one or more statuses in a storage that is configured to retrieve statuses. The instructions further cause the computer to perform receiving from a mobile device, a selection comprising a threshold for a condition and generating a notification if the one or more statuses meet the threshold. The instructions further cause the computer to perform transmitting the notification to the mobile device. The selection may further include a geographic area where the one or more statuses comprise a global positioning system (GPS) location of the vehicle and the threshold for the condition comprises the GPS location being within the geographic area. The instructions may further cause the computer to perform receiving a location of the mobile device where the one or more statuses comprise a global positioning system (GPS) location of the vehicle and the threshold for the condition comprises a proximity of the mobile device to the vehicle. The condition may set separate thresholds for inside the geographic area and outside the geographic area.

DETAILED DESCRIPTION

Figure 1:
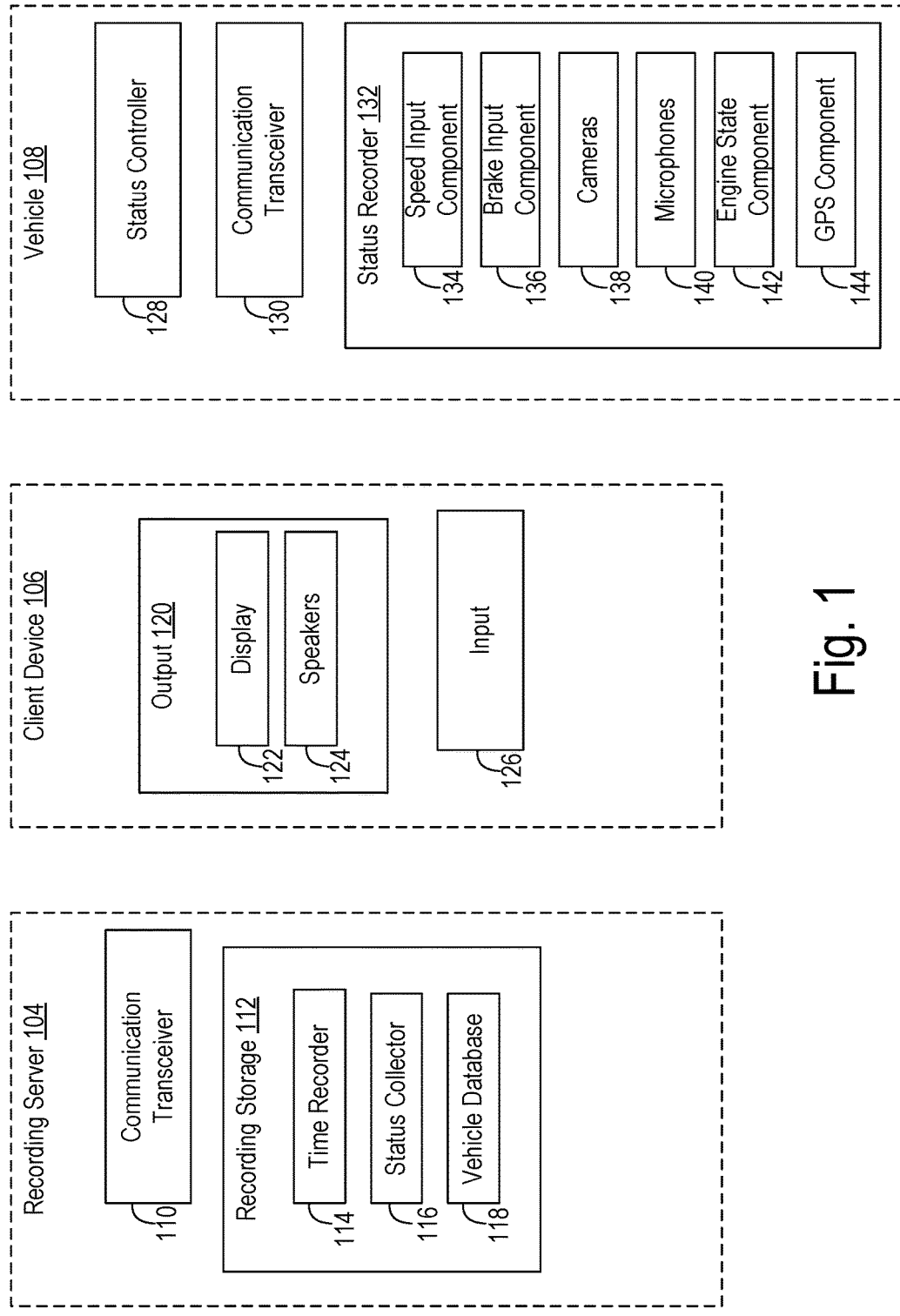
FIG. 1 is a schematic of an embodiment of the vehicle recording system.

The disclosed subject matter is a method and system for recording one or more statuses of the operation of a vehicle such as an automobile. A status may be any state of the vehicle. Examples of statuses may include, but are not limited to: vehicle speed, vehicle location, vehicle engine state, other vehicle statuses, passenger identities, passenger positions, interior video, interior audio, exterior video, and exterior audio.

In an exemplary embodiment, an in-vehicle GPS navigation device may track the average vehicle speed using GPS data and then compare that average speed to the posted speed for the vehicle's current GPS location. The disclosed subject matter may include multiple cameras, inside and outside the vehicle to record the real-time operation of the vehicle and the driver of the vehicle. The recorded data may be stored in a cloud based storage, such as the icloud, and act as a "black box" vehicle operation record. The disclosed subject matter may similarly record audio from inside and outside the vehicle. The recorded audio may also be retrieved based on a time range. The retrieved data from the vehicle operation may be stored for use at a later date for various purposes.

For example, the stored data may be used to track the activity of one or more drivers. The data may, in one instance, be used to grade a driver using various criteria, such as obeyance of safety laws or the correlation of driving behavior to wear-and-tear of the vehicle. In another example, the stored data may be used to determine one or more causes of vehicular accidents. The stored data may be used as evidence in a court hearing. The stored data may be used to aid in the determination of the cause of engine failure in a vehicle. Driving data over a period of time may be correlated to failure of one or more parts in the vehicle, which may be used to improve the design of various vehicle parts.

The disclosed system may be used as a surveillance tool. Stored data may be used to piece together events that are unrelated to the operation of the vehicle. For example, stored vehicle data may be used to determine the driving conditions at a location on a date in the past. Stored vehicle data may be used to identify one or more individuals at a location on a date in the past.

The disclosed system may also be used to stream real-time data of the operation of the vehicle to a client user. The client user may be a parent who wishes to observe the operation a vehicle by their child. The client user may be an employer who wishes to supervise employee drivers of a business. The client user may use the real time data connection to communicate with the driver of the vehicle.

In various embodiments, the system may receive various selections from a mobile client device that sets conditions for the system. For example, the mobile client device may transmit conditions for the system to generate notifications to be sent to the mobile client device. In one instance, the mobile client device may transmit a speed condition whereby the system may generate a notification that is transmitted to the mobile client device when a speed of the vehicle meets a threshold.

Referring to FIG. 1, FIG. 1 is a schematic of an embodiment of the vehicle recording system 100. The vehicle recording system 100 may store one or more statuses of the vehicle based on variables such as time and location. A client user may retrieve the one or more statuses based on the variables. For example, a client user may execute a command to retrieve a speed of an operating vehicle in a time range of one hour. The vehicle recording system 100 may present the speed data of the vehicle for the one hour that was requested. In various embodiments, a client user may request for one or more statuses to be presented to the client user in real time. For example, a client user may request a real time video stream of the interior of a vehicle. The vehicle recording system 100 may stream images from one or more cameras in the interior of the vehicle to the client user.

The vehicle recording system 100 may include a recording server 104, a client device 106, and a vehicle 108. The recording server 104 may continually collect statuses from the vehicle 108. The recording server 104 may be a computing system that is in the vehicle 108 or located away from the vehicle 108. Statuses may be stored by the recording server 104 and retrieved from the recording server 104. A client user may send a request to the recording server 104 for one or more statuses of the vehicle 108. Further, a client user may execute requests based on a time frame. For example, the client user may specify a date, time range, and statuses of the vehicle 108 whereby the recording server 104 may retrieve the requested statuses for the time frame and transmit them to the client user.

The recording server 104 may include a communication component 110 and a recording storage 112. The communication component 110 may have the means to continually receive statuses from a vehicle 108. The statuses may be stored such that they may be retrieved at a later time. Alternatively, the statuses may be immediately streamed to a client device. The communication component 110 may transmit vehicle status data based on a request from a client user. The client user may make a request for vehicle status data to be immediately transmitted from the recording server 104 or transmitted at a later time. For example, the client user may transmit a request to the communication component 110 to transmit a live stream of one or more statuses of the vehicle 108 during a future time range. In one implementation, the client user may request that the communication component 110 transmit a live stream of a video of the interior of the vehicle 108 during evening hours. In another example, the client user may transmit a request to the communication component 110 to only transmit a live stream of statuses of the vehicle 108 while the vehicle 108 is in a geographic location. In one implementation, the client user may request that the communication component 110 begin transmitting vehicle status data when the vehicle 108 is outside of a city boundary.

The recording storage 112 may store one or more statuses that are collected from the vehicle 108. Additionally, the recording storage 112 may retrieve one or more statuses at the request of a client user. In various embodiments, the one or more statuses may be transmitted to the recording storage from a client user via the communication component 110. The requested statuses may be transmitted to the client user via the communication component 110. The recording storage 112 may record a collection time for each status that is collected from the vehicle 108. Thus, a client user may specify a time with a request for statuses. The recording server 104 may retrieve the statuses based on their collection time.

The recording storage 112 may include a time recorder 114, a status collector 116, and a vehicle database 118. The time recorder 114 may record a time field for all statuses that are collected by the recording server 104. Statuses that are recorded continuously may have a time field for every amount of data recorded. For example, a speed status may have a time field such that a unique speed of a vehicle is known for every moment of time. The time recorder may record a time field for all statuses that are collected The status collector 116 may store all statuses that are collected from a vehicle 108. The statuses may be collected continuously at all times or at times that are determined by a client user. For example, a client user may execute a command to collect statuses while the vehicle 108 is running. In another example, the client user may execute a command to collect statuses whenever there are passengers in the vehicle 108. In yet another example, the client user may execute a command to begin collecting statuses when a dangerous condition is met. For example, the status collector may begin collecting statuses when the vehicle 108 experiences a high degree of acceleration for a period of time, which may be an indication of reckless driving.

The status collector 116 may be configured to retrieve statuses based on a variety of criteria. In one example, the status collector 116 may retrieve statuses based on a request to retrieve all statuses that were collected for a vehicle during a time range. Statuses may also be retrieved based on criteria in addition to time. For example, a request may be made to retrieve statuses which were collected while the vehicle was travelling outside of a geographic area. In another example, a client user may make a request to retrieve all statuses during vehicle 108 trips for which the vehicle 108 went above the speed limit in its geographic location. In another example, a client user may make a request for statuses that were collected when unknown voices were recorded by microphones 140 in the vehicle 108.

The vehicle database 118 may identify and differentiate various vehicles for which statuses are collected. In an exemplary embodiment, the vehicle database 118 may create a field that identifies a vehicle 108. The communication component 110 may require a transmission of a vehicle identity to accompany all status collection. A client user may request all statuses based on a vehicle identity.

The client device 106 may be an apparatus that is used by a client user to set up collection of status data and/or display status data that has been collected. A client user may operate the client device 106. The client device 106 may be a computer system that can send and receive data. In various embodiments, the client device 106 is a mobile device such as a cell phone. Additionally, the client device 106 may be a desktop computer system, a laptop, a cloud-based computer system, or the like. The client device 106 may display status information of a vehicle 108.

Further, the client device 106 may play video or audio images that are collected by the recording storage 112. A client user may specify one or more variables to request status information on the client device. The requested status information may be displayed on the client device 106. For example, the client user may specify a time range with which to request status information from the recording server 104. The recording server 104 may retrieve the requested status information and transmit it to the client device 106 via the communication component 110.

Figure 3:
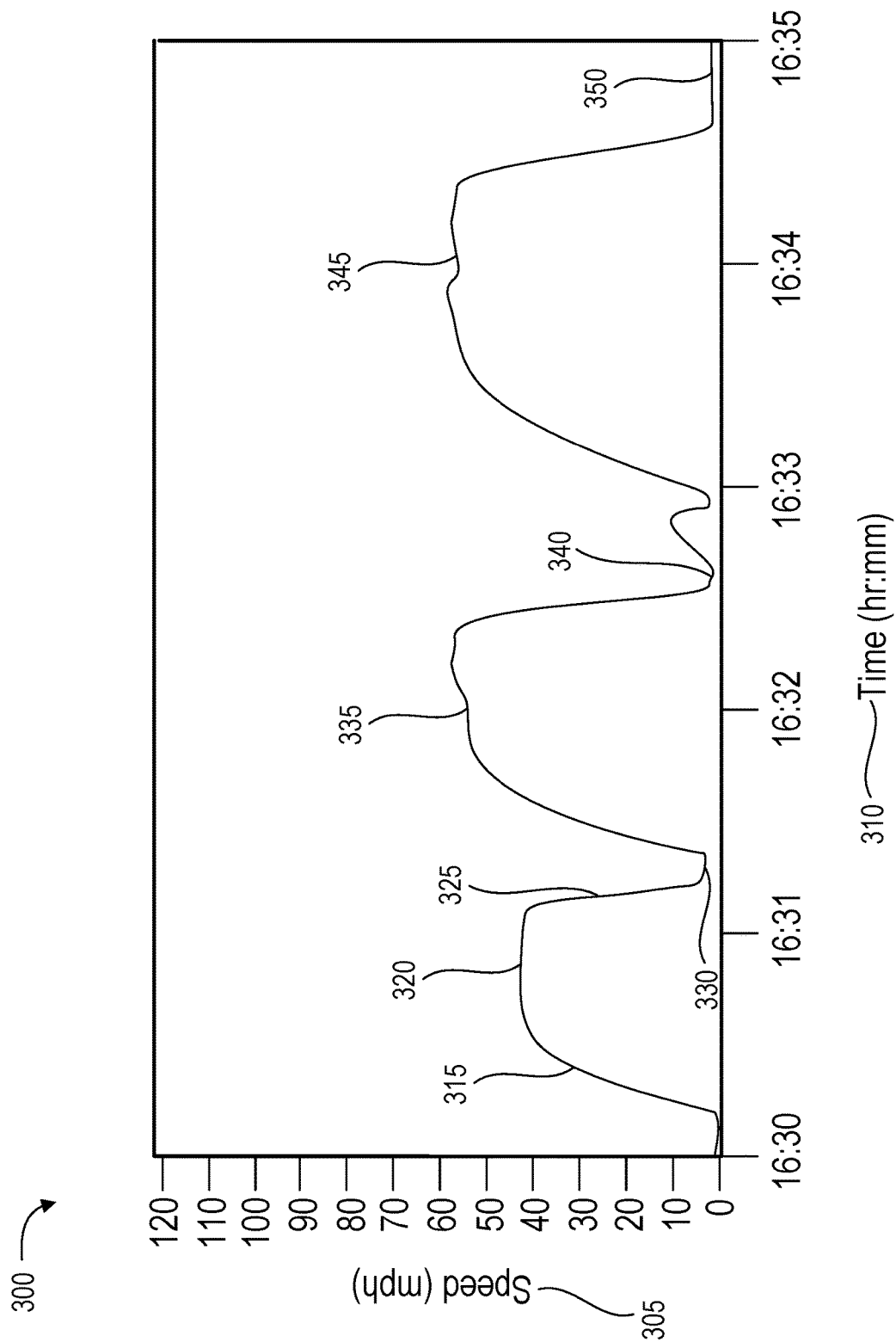
FIG. 3 is an illustration of a data presentation of a speed status over a period of time on a client device.

Retrieved status information may be presented to the client user through output 120 on the client device 106. The output 120 may include one or more means to present status information to the client user. In an exemplary embodiment, the output 120 includes a display 122 and speakers 124. The display 122 may be configured to present vehicle status information in a variety of formats. For example, status data may be presented as a table with one or more variables that relate to statuses of the vehicle 108. In an implementation of the example, a table may present status information as a function of time. In a more specific implementation of the example, a speed status is displayed in a table for a time range. In another example, status data may be presented as a graph with one or more variables. An example of such a graph is shown in FIG. 3.

In various embodiments, a client device 106 may be configured to stream live status information of a vehicle 108. For example, a live GPS location of the vehicle may be presented to the client user. The GPS location, in one implementation, may be presented on a map. In another implementation, the GPS location may be presented as textual coordinates. In an exemplary embodiment, the display 122 may stream live video that is taken from one or more cameras 138 in the vehicle 108. The cameras 138 may take images from an interior or exterior of the vehicle 108.

Also, in an exemplary embodiment, the speakers may play recorded audio of sound that is recorded by one or more microphones 140 in the vehicle 108. The microphones 140 may record audio from the interior or exterior of the vehicle 108. In one implementation, the client device 106 may be configured to stream live audio that is recorded by the microphones 140.

The client device 106 may include one or more inputs 126 to which the client user may enter information to interact with the client device 106. The inputs 126 may include, but are not limited to: a keyboard, a mouse, a touchscreen display, a microphone, a push button, a joystick, a gyroscope/accelerometer, or the like. In various embodiments, the client user may use one or more inputs 126 to enter information that is used to set up the collection of status information from a vehicle 108. For example, the client user may enter a time to start collecting status information by using the one or more inputs on the client device 106. In another example, the client user may enter one or more conditions for which status information is collected. For instance, the client user may specify that status information should be collected for a driving session if the average gas mileage is below a threshold, which would indicate aggressive driving. In yet another example, the client user may enter a command through the one or more inputs 126 for the recording server 104 to stream one or more statuses of the vehicle 108 live. The live statuses may be presented via the output 120 of the client device 106.

The vehicle 108 is where status information is collected. The status information that is collected by the vehicle 108 may be directed by a status controller 128. The status controller 128 may be a computer system with a processor and memory. The status controller 128 may activate the collection of status information. For example, a command may be received from the recording server 104 to begin collecting status information. The status controller 128 may execute the command to start or stop the collection of status information.

The status information may be collected and transmitted by a communication component 130. The communication component 130 may transmit status information to the recording server 104, which in turn may transmit the status information to the client device 106. In various embodiments, the recording server 104 is inside the vehicle 108. In an exemplary embodiment, the recording server 104 records and stores vehicle status information at a secure location away from both the vehicle 108 and the client device 106.

The vehicle 108 includes a status recorder 132 that records one or more statuses of the vehicle 108. A status may be any variable that describes a state of the vehicle 108. For example, a status may be the speed or direction in which the vehicle 108 is travelling. Another example of a status may be the physical location of the vehicle 108 or the gear in which the engine is running. Statuses may include camera images or audio recordings from inside or outside the vehicle 108.

In an exemplary embodiment, the status recorder 132 may include a speed input component 134, a brake input component 136, one or more cameras 138, one or more microphones 140, an engine state component 142, and a GPS component 144. The status recorder 132 may collect the status information that is measured by various components. For instance, the speed input component 134 may measure the speed of the vehicle. The statuses recorded by the status recorder 132 may be transmitted to the recording server 104.

The brake input component 136 may record the degree of braking that is applied to the vehicle 108 while the vehicle 108 is in operation. In one embodiment, the brake input component 136 records the operation of a brake-by-wire system for controlling the brakes of the vehicle 108. The one or more cameras 138 may record images from the interior or exterior of the vehicle 108. For example, the one or more cameras 138 may record video or images of the interior of a vehicle to record the actions of passengers that are in the vehicle 108. Images from the one or more cameras 138 may be processed by a machine learning algorithm to determine a context for an image. Various machine learning algorithms may be leveraged to process camera 138 images.

In an exemplary embodiment, a neural network is used to process camera 138 images. The neural network may be trained with a multitude of test images, which are used to teach the neural network to return an output that accurately describes the test images. The neural network itself comprises nodes that are arranged in layers, including an input layer, hidden layers, and an output layer. Camera images are transmitted into the input layer of nodes, whereby each node of the input layer may accept a different portion of the camera image. In one example, each pixel of a camera 138 image is received by a different input node. The nodes of the input layer are connected to one or more nodes of a hidden layer or, if there are no hidden layers, the output layer.

The various nodes are connected by a synapse whereby data may propagate from the input layer to the hidden layer and to the output layer through the synapses. Data values in a node are transmitted by each synapse, connecting the node to the next layer, to a subsequent node. Each synapse has a weight. Data that is transmitted by the synapse is multiplied by the weight. Like each synapse has a weight, each node has a bias. Data values that are received by a node from nodes of a preceding layer are added together, then added to a variable bias, and then passed through an activation function to introduce non-linearity to the node. In various neural networks, a Sigmoid function is used as the activation function.

The neural network may be tuned by modifying the weights of the synapses and biases of the nodes based on an error made by the neural network. Various optimization methods may be leveraged to tune the neural network. An exemplary embodiment uses a process called backpropagation to tune the neural network by propagating data backward starting at the output layer and adjusting the biases and weights based on the error.

There are multiple open source and commercial machine learning algorithms that may be leveraged by a software programmer to learn how to determine a context of camera images. In various embodiments, camera images may be processed to describe traffic around the vehicle 108. In an exemplary embodiment, the camera images may be processed to describe the inside of the vehicle 108. For instance, the recording server 104 may process a camera 138 image to describe the passengers in a vehicle 108. In a further exemplary embodiment, the camera 138 images may be processed to read street signs. Accordingly, the neural network may be taught to read street signs. Notifications or alerts may be generated based on descriptions of the processed camera 138 images.

The one or more microphones 140 may record the audio from inside or outside the vehicle 108. Additionally, the one or more microphones 140 may record sounds of the operation of the engine of the vehicle 108, which may indicate issues with the vehicle 108. Noises from the exterior of the vehicle 108 may record information that is not captured by cameras, such as screeching from the engagement of brakes of another vehicle. The noise from the interior of the vehicle 108 may indicate the actions of one or more passengers. For instance, distracting speech from a passenger may be recorded by the one or more microphones 140.

The engine state component 142 may record one or more measurements of the operation of the vehicle's engine or other components of the vehicle 108. For example, the engine state component 142 may record errors that are triggered by sensors in the vehicle 108 to activate a check engine light. In another implementation, the engine state component 142 may record the rotations per minute (RPMs) of the engine. In yet another implementation, the engine state component 142 may record the gas mileage of the engine. In yet another implementation, the engine state component 142 may record vehicle sensor data such as tire pressure, engine temperature, and oil pressure.

The GPS component 144 may record a GPS location of the vehicle 108. In various embodiments, the GPS locations may be processed to determine a speed of the vehicle 108. In an exemplary embodiment, the status controller 128 may be configured to record statuses when conditions are met. A condition may be based on a location that is recorded by the GPS component 144. In various embodiments, GPS locations are continually recorded at all times.

The radar sensor 146 may record positions of objects around the vehicle 108 that reflect electromagnetic radiation pulses that are generated from one or more emitters on the vehicle 108. A radar sensor 146 can determine a direction and a distance of objects by measuring the time that pulses take to return to a receiver. Radar emitters typically emit pulses in the radio wave spectrum. The status recorder 132 may also include LiDAR sensors, which are not shown in FIG. 1. LiDAR sensors work similarly to the radar sensor 146, but typically emit pulses in the infrared spectrum and thus reflect from different objects from the radar sensor 146.

The vehicle 108 may have multiple radar and LiDAR sensors that can create a 3d image of the surroundings of the vehicle 108.

Figure 2:
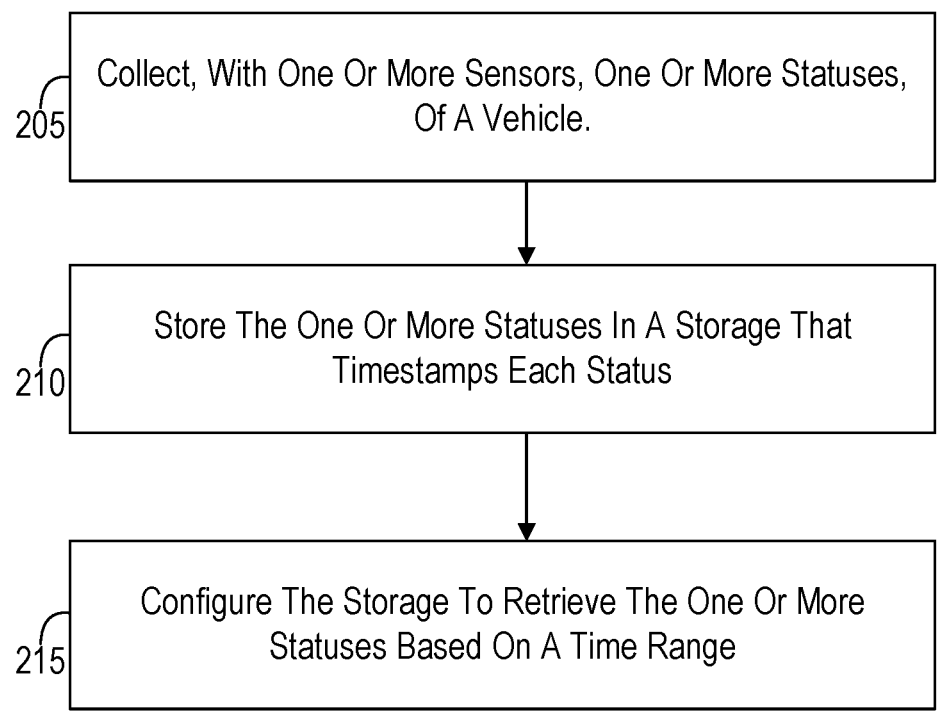
FIG. 2 is a flow diagram of a process for recording vehicle data.

Referring to FIG. 2, FIG. 2 is a flow diagram of a process 200 for recording vehicle data. The process 200 may be employed to record one or more statuses from the operation of a vehicle 108. Statuses may be transmitted to a recording server 104. The recorded statuses may be retrieved by a request to the recording server 104 to be presented on a client device 106. In various embodiments, the request to retrieve one or more statuses may include one or more variables to filter the statuses. For example, a time variable may be specified in the request to retrieve statuses that were recorded with a time range. In another example, a position variable may be specified such that the request specifies the retrieval to statuses that were recorded within at geographic location. Combinations of variables may be implemented to retrieve statuses. For example, a request may specify the retrieval of statuses for which the speed was above a threshold and exterior cameras recorded low visibility conditions.

At step 205, the recording server 104, may collect, with one or more sensors, one or more statuses of a vehicle 108. The statuses may be collected by the status recorder 132 in the vehicle 108. The status recorder 132 may be directed by the status controller 128. In various embodiments, the status controller 128 may be configured to activate or deactivate collection by the status recorder 132 based on one or more conditions. For example, the status controller 128 may be configured to activate the status recorder 132 if it is unable to identify the driver of the vehicle 108 as the owner. The identification of the driver may be accomplished through facial recognition of images of the driver by the cameras 138. In an exemplary embodiment, the driver may be identified by the presence of a mobile device that is carried by the driver. For instance, a cellular phone may transmit a Bluetooth® signal that identifies the driver to the status controller 128.

At step 210, the recording server 104 may create a time field for each of the one or more statuses. The recording server 104 may collect the statuses from the vehicle 108 and record the time of each status in a field. The statuses may be stored in a storage that is accessible to the recording server 104. The storage may comprise various embodiments of data storage such as magnetic tape drives and solid-state drives. The storage may be physically attached to the recording server 104 or may be at an off-site location such as a cloud storage.

At step 215, the recording server 104 may store the one or more statuses in a storage that is configured to retrieve the one or more statuses based on a time range. The storage, such as the recording storage 112, may be configured to retrieve statuses based on a request. In various embodiments, the request may comprise a time range. For example, the statuses that were collected over the period of an hour may be requested. Upon receiving the request, the recording server 104 may retrieve the requested statuses from the recording storage 112 whereby the requested statuses may be transmitted to a client device 106. The one or more statuses may be presented on the client device in a variety of formats. An example of a presentation of a speed status on a client device is shown in FIG. 3.

Referring to FIG. 3, FIG. 3 is an illustration of a data presentation 300 of a speed status over a period of time on a client device 106. A speed status of a vehicle 108 may be collected on a continuous basis by the speed input component 134. In various embodiments, the speed input component 134 may collect speed data from a CAN bus system of a vehicle 108. A time field may be added to all collected speed data such that the speed that the vehicle 108 was travelling at any given time may be retrievable.

The data presentation 300 is a graph that displays the speed 305 of a vehicle on a y-axis and the time 310 on an x-axis. Various time ranges may be presented depending on the request from the client user. The data presentation 300 displays a graph of the speed of a vehicle 108 over a period of 5 minutes. As shown in the graph, the speed on the vehicle 108 varies with multiple high speed and low speed portions.

The graph shows an acceleration portion 315 when the vehicle 108 was accelerating. The acceleration portion 315 is followed by a first high-speed portion 320 and then by a braking portion 325. In various embodiments, braking may also be recorded by the brake input component 136. The braking portion 325 is followed by a first low-speed portion 330.

The first low-speed portion 330 is followed by a second high-speed portion 335 and a second low-speed portion 340. According to the data presentation 300, the vehicle 108 accelerated again for a third high-speed portion 345 and braked one last time to reduce the speed for a third low speed portion 350. Accordingly, the speed data that is presented by the data presentation 300 may describe the operation of the vehicle 108 fairly well despite being limited to two numerical variables. In various embodiments, the additional statuses may be presented as well. For example, the GPS location of the vehicle 108 may be displayed for various times. In yet another example, the state of the engine operation may be displayed. In an implementation of the presentation of the engine state, error conditions may be shown in addition to the speed of the data presentation 300. An example of an error condition may be a faulty valve error or a low tire pressure error.

Figure 4:
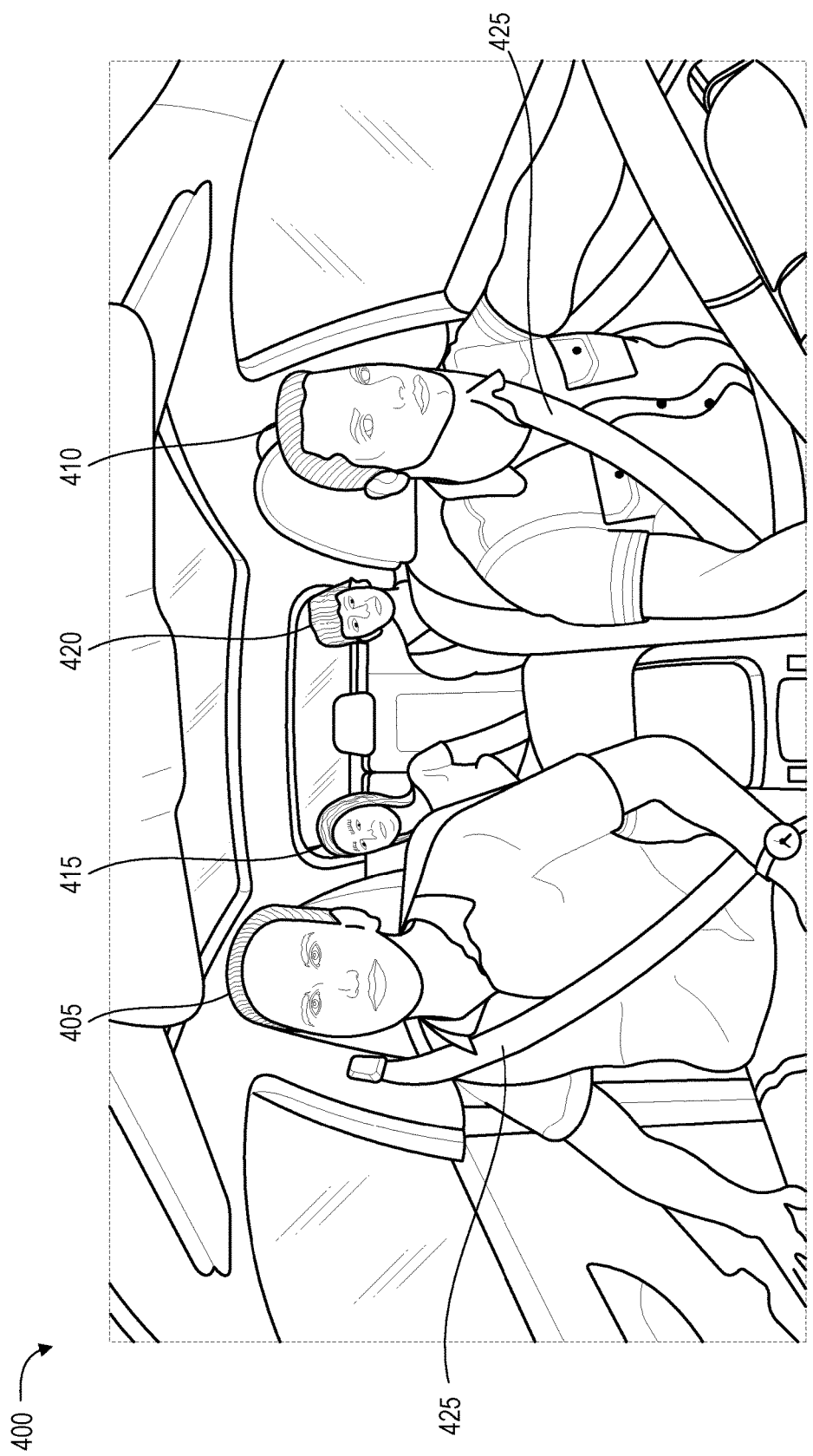
FIG. 4 is an illustration of data variables based on the interior of a vehicle that may be recorded by the disclosed subject matter.

Referring to FIG. 4, FIG. 4 is an illustration 400 of data variables based on the interior of a vehicle that may be recorded by the disclosed subject matter. Images of the interior of a vehicle 108 may display various information of a driving session. For example, injuries of passengers in a vehicle crash may be recorded by cameras 138 in the vehicle 108. Both images and video may be recorded by the cameras 138. Additionally, status data that is collected for other statuses may be correlated to the camera images. For example, data from the speed input component 134, the brake input component 136, and the one or more microphones 140 may be combined with image data from the cameras 138.

The illustration 400 shows some of the variables that may be collected based on an interior camera that is mounted in the front of a passenger compartment of an automobile and is directed back toward the passengers. As shown in FIG. 4, there is a front passenger 405, a front driver 410, a first back passenger 415 and a second back passenger 420. A seat belt 425 is visibly being used by the front passenger 405 and the front driver 410.

The illustration 400 shows that the passengers are generally sitting in proper positions to be riding in an automobile. As such, the camera image could be used to show that the passengers were not behaving erratically the moment before a vehicle accident. Alternatively, a camera image of the passengers may indicate the source of erratic driving behavior. For example, a driver that is accused of driving under the influence of drugs or alcohol could defend themselves by using images from the interior to show that the driver was actually being distracted by unruly passengers. Further, the image of the four vehicle passengers could be used as evidence of their location at a time in relation to a crime or tort.

Figure 5:
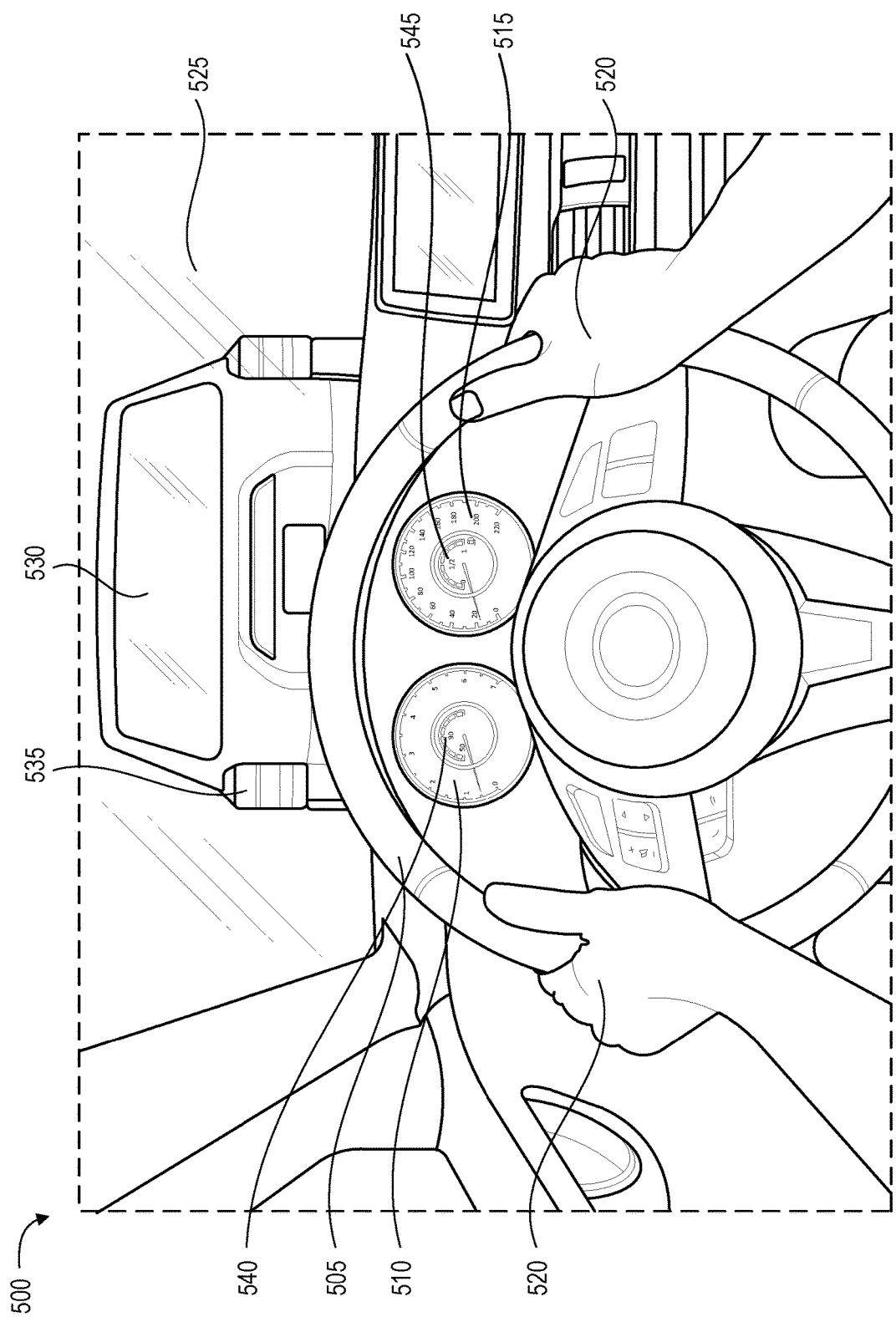
FIG. 5 is an illustration of data variables, based on a vehicle driver's view, that may be recorded by the disclosed subject matter.

Referring to FIG. 5, FIG. 5 is an illustration 500 of data variables, based on a vehicle driver's view, that may be recorded by the disclosed subject matter. The view of the driver shows several variables that indicate the state of the vehicle, the driver, and the visibility of the driver. In an exemplary embodiment, multiple statuses of the vehicle 108 may be gathered from a single camera image.

For example, the angle of the steering wheel 505 indicates the direction that the vehicle 108 is being steered at the time of the image. In various embodiments, the angle of the steering wheel 505 may be tracked by one or more cameras 138 in the vehicle 108. Similarly, the measurement of the tachometer may be tracked by the one or more cameras 138 to show the rotation speed of the vehicle engine. An oil pressure gauge 540 may indicate the oil pressure of the vehicle 108. Images of the tachometer 510 and oil pressure gauge 540 may provide useful information for the state of a vehicle engine in the time leading up to an engine failure.

An image of the speedometer 515 may provide the speed of the vehicle 108 without the need to tap into the vehicle electronic system to extract the speed. Additionally, the image of the speedometer may provide a second or third speed status, which may or may not agree with a speed input that is collected from the vehicle CAN bus. Similarly, the gas gauge 545 may provide the fuel level of the vehicle 108.

The positions of the driver's hands 520 on the steering wheel 505 may be an indication of the level of distraction of the driver of the vehicle 108. Further, the positions of the driver's hands 520 may also indicate the level of control that the driver has over the vehicle 108. For example, a driver's hands 520 that do not react normally to imminent danger could indicate that there is something wrong with the driver. On the other hand, a driver's hands 520 that struggle abnormally with the steering wheel 505 could indicate that there is something wrong with the vehicle 108 steering system.

In addition to the interior of the vehicle 108, the interior cameras 138 may capture useful information from the exterior of the vehicle 108. The view through the front windshield 525, for instance, gives a good approximation of the view that the driver has. For instance, the visibility of the driver may be better understood from the interior view than an exterior view. The presence of an outside vehicle 530 may be shown by the one or more cameras 138. Additionally, the brake lights 535 of the outside vehicle 530 may indicate the braking state of the outside vehicle 530.

Figure 6:
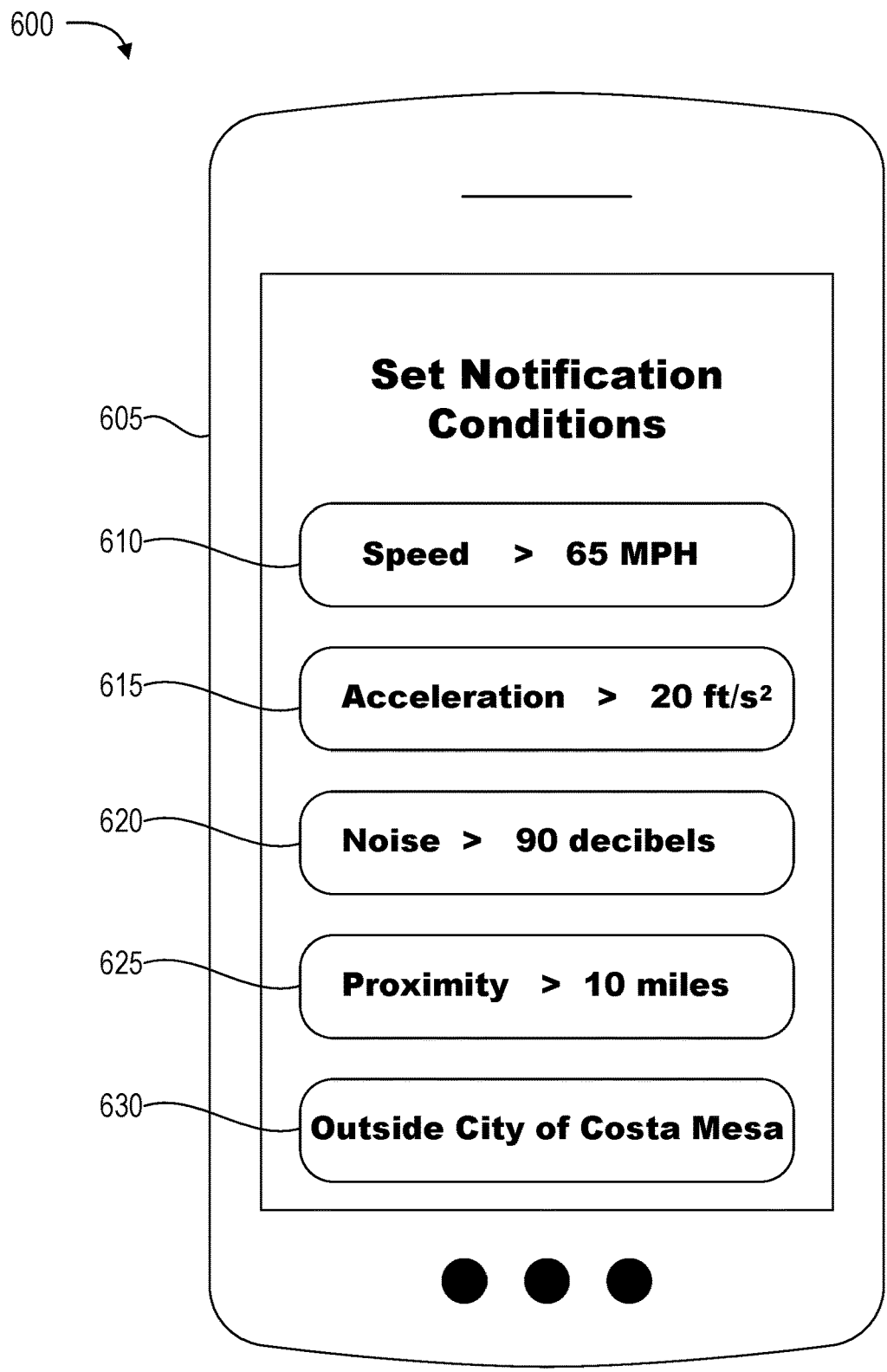
FIG. 6 is an illustration of selection notification conditions in an application on a mobile device.

Referring to FIG. 6, FIG. 6 is an illustration 600 of selection notification conditions in an application on a mobile device 605. The client device 106 may be a mobile device 605 such as a mobile phone that has a wireless connection to the recording server 104. The mobile device 605 may be capable of receiving notifications based on statuses in the vehicle 108. Notifications may also be dependent on one or more settings on the mobile device 605.

For example, a user of the mobile device 605 may set one or more conditions for notifications, which are based on one or more conditions of the vehicle 108. The mobile device 605 may transmit the one or more conditions to the recording server 104. Notifications may be triggered by the recording server 104 when a status of the vehicle 108 meets the one or more conditions. For instance, a notification may be triggered when a camera image shows a street sign. A notification may be triggered when a radar sensor 146 shows that the vehicle 108 is not travelling at the same speed as the flow of traffic. A notification may be triggered when a camera image is processed to recognize a specific individual.

FIG. 6 shows various conditions that may be set on the mobile device 605. For example, a user may set a speed condition 610, whereby the notification is triggered when the vehicle 108 goes above or below a speed condition. The speed condition 610 in the illustration 600 is set at 65 MPH, which would trigger a notification when the vehicle 108 is travelling at more than 65 miles per hour. In various embodiments, the mobile device 605 may transmit one or more conditions to the recording server 104. The recording server 104 may receive the one or more conditions and transmit a notification to the mobile device when the one or more conditions are met.

Conditions may be tied to any status that is transmitted from the recording server 104. In another example, a user may set an acceleration condition 615 whereby a notification is triggered when the vehicle 108 experiences an acceleration that exceeds a set value. The set value that is shown in FIG. 6 is 20 feet per second per second. The acceleration may be recorded by an accelerometer in the vehicle 108. Further, the acceleration may be computed as an average acceleration over time, such as an average acceleration over a period of 2 seconds. Another condition may be a noise condition 620 whereby the notification is triggered and sent to the mobile device 605 when a noise status is above or below a threshold.

Various conditions that the recording server 104 may receive from the mobile device 108 include a proximity condition 625 and a geographic area condition 630. The proximity condition 625 may be a distance from the vehicle 108 to the mobile device 605. The location of the vehicle 108 may be determined by the GPS component 144. The mobile device 605 may determine its location with various means such as a GPS in the mobile device 605, a location based on a cellular signal, a location based on a WIFI signal, and a location based on a camera in the mobile device 605. The proximity condition 625 shown in FIG. 6 is triggered when the proximity is less than 10 miles. Alternatively, the proximity condition 625 may be triggered when the distance between the vehicle 108 and the mobile device 605 is less than a distance or between two distance values.

The geographic area condition 630 is triggered when the vehicle is inside or outside a geographic area. The illustration 600 shows a geographic area condition 630 of a location outside the city of Costa Mesa. Thus, a notification may be triggered when the status recorder 132 determines a position that is outside the city limits of Costa Mesa. Various other geographic areas may be set as the geographic area condition 630. For example, the geographic area may be a portion of a municipality, a combination of municipalities, or other types of geographic boundaries.

Figure 7:
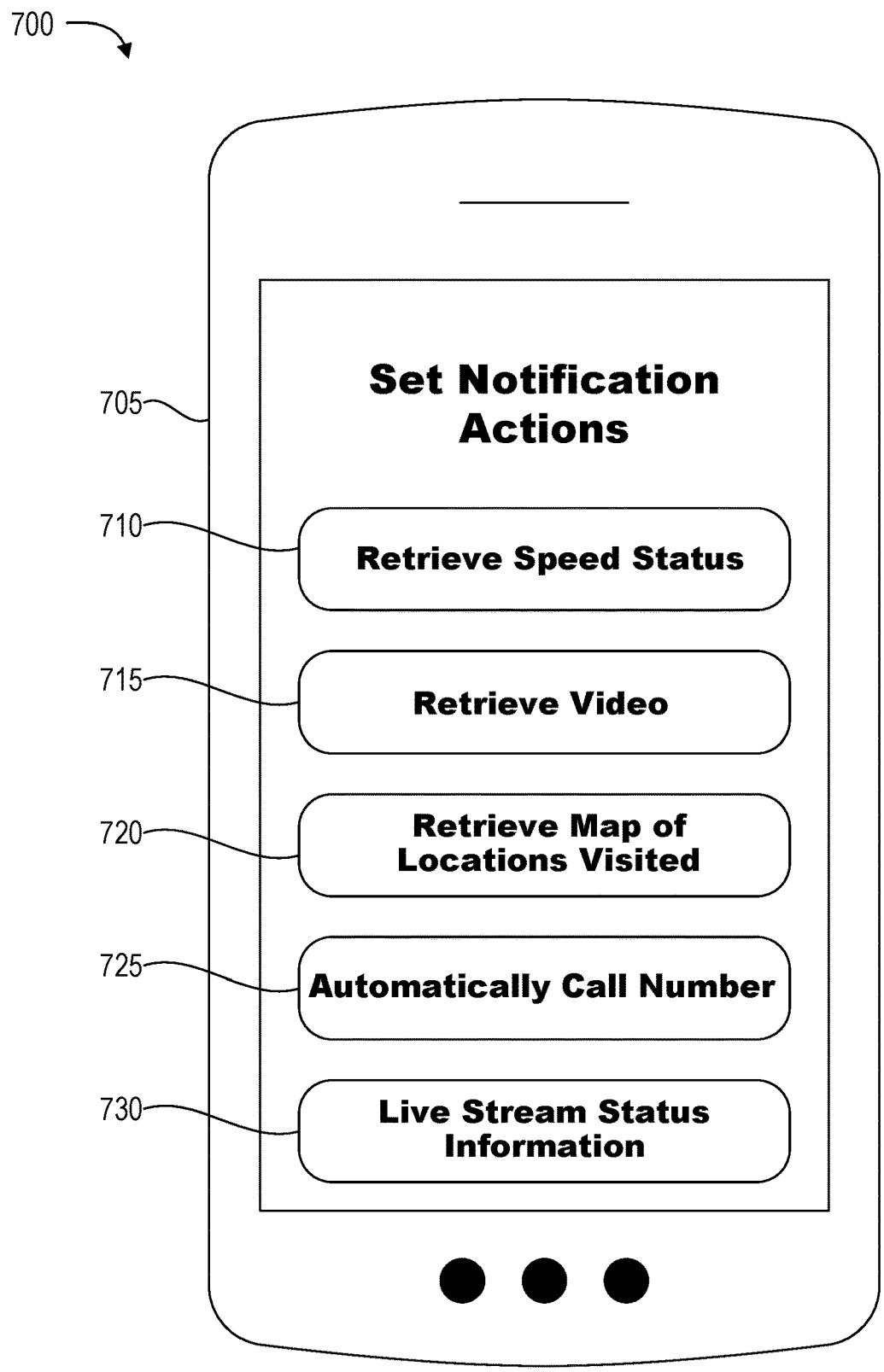
FIG. 7 is an illustration of setting notification actions in an application on a mobile device.

Referring to FIG. 7, FIG. 7 is an illustration 700 of setting notification actions in an application on a mobile device. A notification action is taken in response to the notification being triggered. A user of a mobile device 705 may set one or more notification actions and transmit them to the recording server 104 to execute when a notification is triggered.

The retrieve speed status 710 notification action transmits the speed status of the vehicle 108 to the mobile device 705 when the notification is triggered. The condition that triggers the notification does not have to correspond to the notification action. For instance, the user may set the retrieve speed status 710 notification action to be executed when the noise condition 620 is triggered. Thus, the recording server 104 may transmit a speed status to the mobile device 705 when the noise condition is triggered.

The mobile device 705 may transmit an instruction to the recording server 104 to execute multiple notification actions when a notification is triggered. For instance, the retrieve speed status 710 notification action and retrieve video 715 notification action may be executed simultaneously when a notification is triggered. The retrieve video 715 notification may an action that, when executed, transmits a video from inside and/or outside the vehicle 108 to the mobile device 705.

Additional notification actions that are shown in the illustration 700 are a retrieve map of locations visited 720 notification action, automatically call number 725 notification action, and live stream status information 730 notification action. The retrieve map of locations visited 720 notification action may be an instruction for the recording server 104 to transmit location information over of period of time to the mobile device 705. The location information may be presented on the mobile device as a map. The automatically call number 725 notification action is an instruction to transmit a communication to a third party. For example, the automatically call number 725 notification action may prompt the communication transceiver 110 to call a phone number with a message relating to the notification. The automatically call number 725 notification action is not limited to phone calls. Other transmissions include, but are not limited to email, text, web page post, and social media post.

The live stream status information 730 notification action may execute an instruction to stream one or more vehicle statuses to the mobile device 705. For instance, the live stream status information 730 notification action may cause the recording server 104 to transmit a stream of the speed and location data to the mobile device 705. Alternatively, the live stream status information 730 notification action may cause the recording server 104 to transmit a live stream to a third party or URL address.

Figure 8:
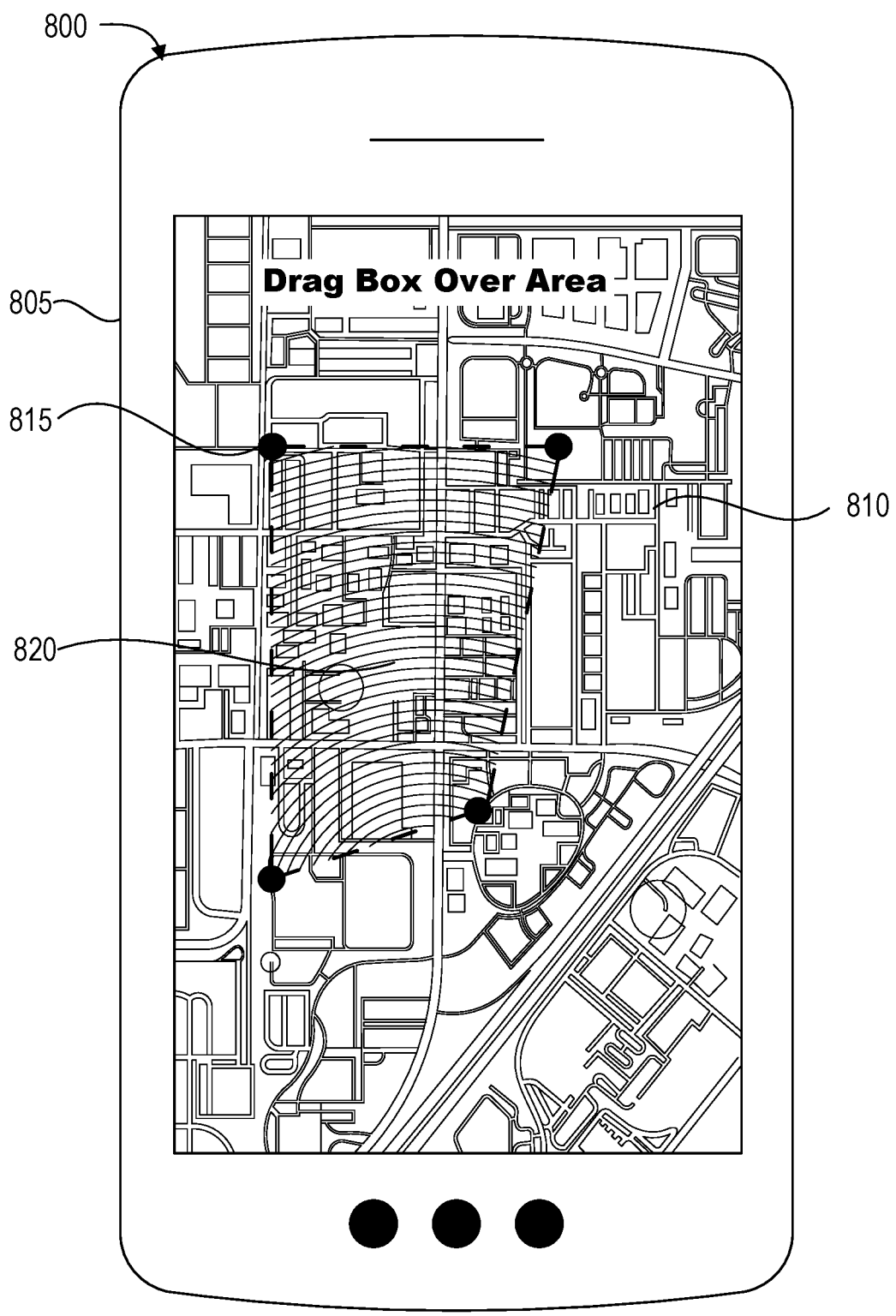
FIG. 8 is an illustration of setting a geographic area in an application on a mobile device.

Referring to FIG. 8, FIG. 8 is an illustration 800 of setting a geographic area 820 in an application on a mobile device 805. The mobile device 805 may run an application that transmits and receives information to/from the recording server 104. As shown in the illustration 800, the application on the mobile device 805 may be used to define a unique geographic area 820.

An application on the mobile device 805 may prompt a user of the mobile device 805 to select a geographic area relating to conditions for various notifications such as the geographic area condition 630. The application may allow a user to select municipalities, roads, natural landmarks, or combinations thereof to define a geographic area. In the embodiments shown in FIG. 8, the application prompts a user to select points 815 on a map 810 that define the geographic area 820. The area inside the points 815 on the map 810 defines an area that may be used for a geographic area condition 630. As such, the application may prompt a user to define the geographic area 820 when the user attempts to implement a geographic area condition. The condition may be triggered when a vehicle 108 enters or exits the geographic area 820. Additionally, a geographic area condition 630 may be implemented in combination with one or more other notification conditions. For instance, a notification may be triggered if a speed status drops below a set speed while the vehicle 108 is within a geographic area 820, which might indicate that something is wrong with the vehicle 108.

Once the user selects a geographic area 820, the mobile device 805 may transmit the geographic area 820 to the recording server 104. The mobile device 805 may also transmit a selected notification action that is associated with the geographic area 820. A further condition for the geographic area 820 may be to only implement the geographic area condition when the mobile device 805 is inside/outside the geographic area 820. Thus, the mobile device 805 may continually transmit a location of the mobile device 805 to the recording server 104.

Figure 9:
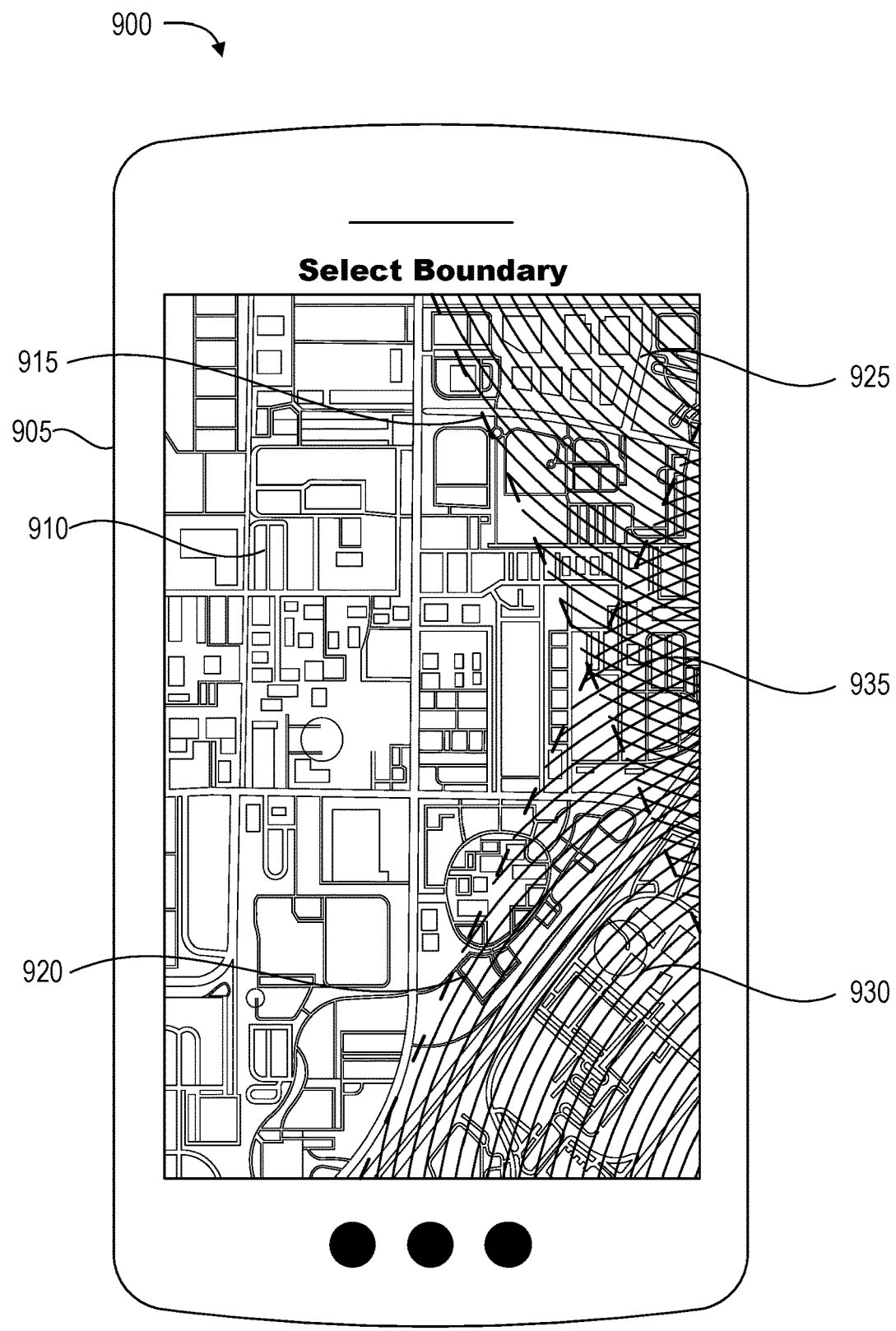
FIG. 9 is an illustration for a setting of a geographic boundary on a 910 in an application on a mobile device.

Referring to FIG. 9, FIG. 9 is an illustration 900 for a setting of a geographic boundary on a map 910 in an application on a mobile device 905. Instead of defining a geographic area that is a closed space, as shown in FIG. 8, the geographic area may be defined by one or more boundary lines on a map 910. A condition may be triggered when the vehicle 108 crosses one or more of the boundary lines.

The illustration 900 shows a first boundary line 915 and a second boundary line 920. One side of the first boundary line 915 has a first shaded area 925 to differentiate one side from the other. Likewise, one side of the second boundary line 920 has a second shaded area 930. A user may be prompted to create and place the one or more boundary lines when the user implements a geographic area condition 630. The shaded areas may indicate areas on a map 910 where a geographic area condition 630 is triggered.

The application may cause the mobile device 905 to transmit coordinates for the boundary lines and shading to the recording server 104. Any number of boundary lines may be incorporated into a geographic area condition 630. In various embodiments, the boundary lines are straight, as shown in the illustration 900. In an exemplary embodiment, a boundary line is affixed to a natural landmark that is not straight, such as a road, a state line, or a body of water. In various embodiments, the user may specify a vector comprising a distance and a direction. The distance and direction may be added to the boundary. In one example, the boundary may be a line at is 4 miles west of a road. In another example, the boundary may be a line that is one mile to the north of the mobile device. As the mobile device moves, the boundary may move if the boundary is dependent on the location of the mobile device.

As disclosed above, the geographic area condition 630 may be combined with one or more other notification conditions. In an exemplary embodiment, multiple geographic area conditions 630 may be combined such that a notification is triggered only when all of the multiple geographic area conditions are met. An example of the exemplary embodiment for multiple geographic area conditions 630 is shown in FIG. 9. The third shaded area 935 shows the geographic area where the boundary condition of crossing the first boundary line 915 and second boundary line 920 are both met.

In various embodiments, geographic area conditions 630 may be combined with other conditions. In one example, a first geographic area condition 630 may be combined with a first speed condition. A notification is triggered when a vehicle 108 is inside the first geographic area AND exceeds the first speed condition. Likewise, a second geographic area condition may be combined with a second speed condition that is different from the first speed condition. When the example is implemented in the illustration 900, a notification is triggered when a vehicle 108 exceeds the first speed condition while the vehicle is in the first shaded area 925. Also, a notification is triggered when the vehicle 108 exceeds the second speed condition while the vehicle is in the second shaded area 930. In various embodiments, a third speed condition may be set for when the vehicle 108 is in the third shaded area 935.

Figure 10:
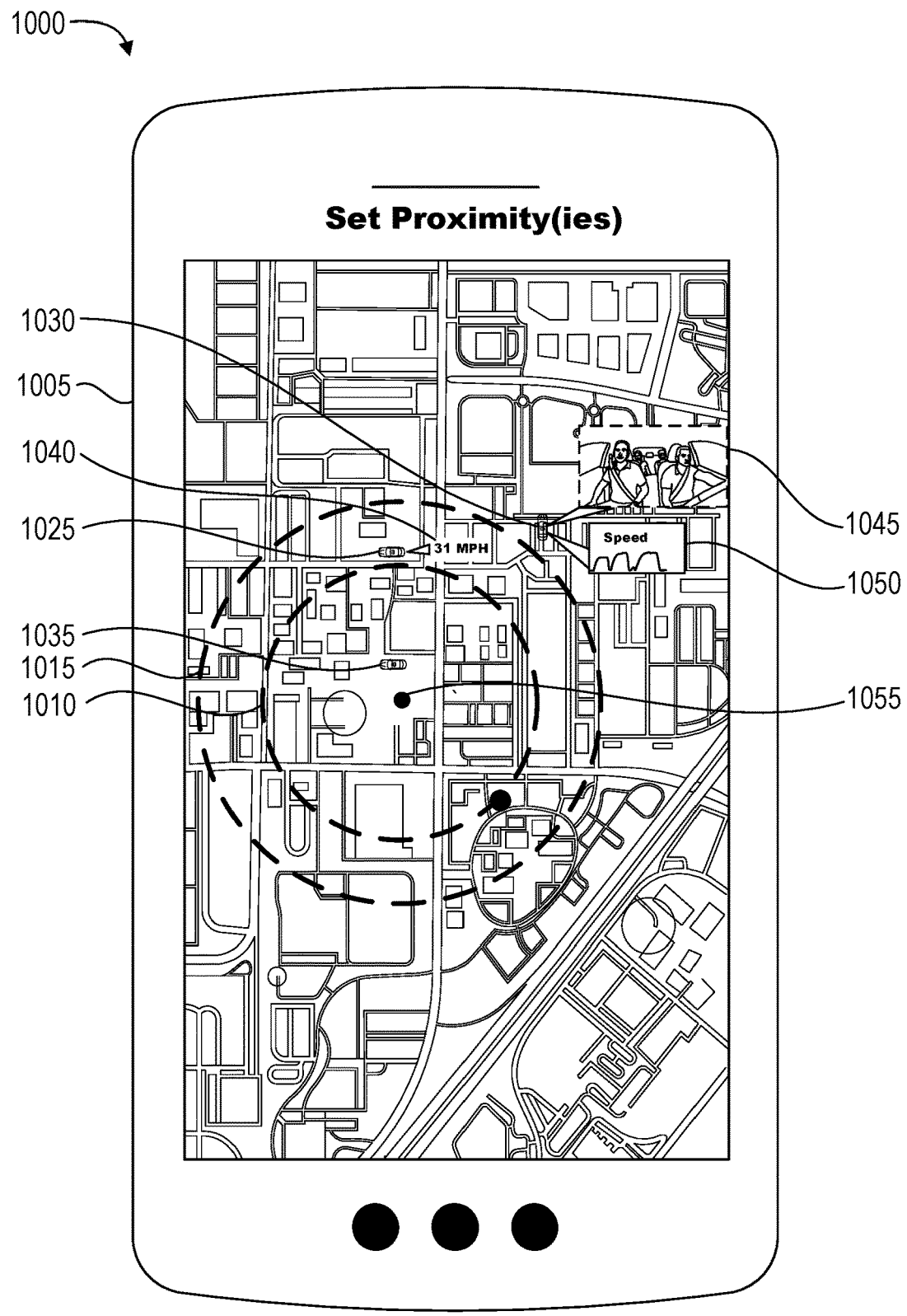
FIG. 10 is an illustration of a setting of multiple proximity conditions in an application on a mobile device.

Referring to FIG. 10, FIG. 10 is an illustration 1000 of a setting of multiple proximity conditions in an application on a mobile device 1005. The multiple proximity conditions may be transmitted from the mobile device 1005 to the recording server 104. The recording server 104 may determine when the proximity conditions are met. Further, the recording server 104 may execute one or more notification actions in response to triggering of the proximity conditions.

The recording server 104 may transmit locations of one or more vehicles 108 to a mobile device 1005. Accordingly, the illustration 1000 shows locations of a first vehicle 1035, a second vehicle 1025, and a third vehicle 1030 on a map. The center location 1055 on the map may be any fixed or moving position. In various embodiments, the center location 1055 is a GPS position of a mobile device 1005. The mobile device 1005 may transmit its GPS location to the recording server 104. The recording server 104 may determine whether the GPS location of the mobile device 1005 is within or outside a set distance.

The set distance may be a proximity of the vehicle 108 to the mobile device 1005. The recording server 104 may collect statuses from one or more vehicles 108, whereby one or more of the vehicle statuses may be transmitted to the mobile device 1005. In various embodiments, a mobile device may receive vehicle statuses from multiple recording servers 104. A user of the mobile device 1005 may set a proximity condition 625, which is transmitted to the recording server 104. The recording server 104 may determine whether the vehicle 108 is inside or outside the proximity that was set by the user.

The proximity boundary may be transmitted from the recording server 104 to the mobile device 1005. In various embodiments, the proximity boundary is displayed on the mobile device 1005. The illustration 1000 shows a first proximity boundary 1010 and a second proximity boundary 1015. A user may set proximity conditions 625 to be triggered when the vehicle 108 is within or outside the proximity.

In an example that is shown in FIG. 10, a user may set a proximity condition that is implemented to multiple vehicles at once. In the example, the recording server 104 for each vehicle 108 may be instructed to update the location of the vehicle 108 regardless of the proximity, and to perform additional notification actions when the vehicles 108 are beyond a set distance. Accordingly, the first vehicle 1035 is inside the first proximity boundary 1010 and inside the second proximity boundary 1055. A recording server 104 takes no notification action but to transmit the location of the first vehicle 1035 to the mobile device 1005. The second vehicle 1025 is outside the first proximity boundary 1010 and inside the second proximity boundary 1015. As such, the recording server 104 for the second vehicle 1025 may be instructed to transmit a speed status 1040 of the second vehicle 1025. The mobile device 1005 may be configured to display the speed status of the second vehicle 1025, which was received from the recording server, on a screen of the mobile device 1005.

The recording server 104 may be instructed to take different actions based on various proximity boundary combinations. For the example shown in FIG. 10, the third vehicle 1030 is outside the first proximity boundary 1010 and outside the second proximity boundary 1015. The recording server 104 may be instructed to transmit a video stream 1045 from a camera in the third vehicle 1030. Further, the recording server 104 may be instructed to transmit a speed status 1050 over a period of time.

In FIG. 10, one mobile device 1005 is receiving vehicle status data from multiple recording servers 104. Likewise, one recording server 104 may transmit vehicle status data to multiple client devices 106. In an exemplary embodiment, the recording server 104 may receive a request from a client device 106 to receive vehicle status data. The recording server 104 could confirm the request for any number of client devices. In one example, the request may be for a limited amount of time. For instance, a mobile device 1005 may request status information from a shared vehicle such as a rental vehicle, Uber, Lyft, a borrowed vehicle, various autonomous vehicles, etc. The request may be made through various communication means. In one example, the request is made over the internet through a URL address. The URL address may be encoded in a QR code that is visible on a vehicle. Thus, a user may easily request vehicle status information by scanning the QR code.

Figure 11:
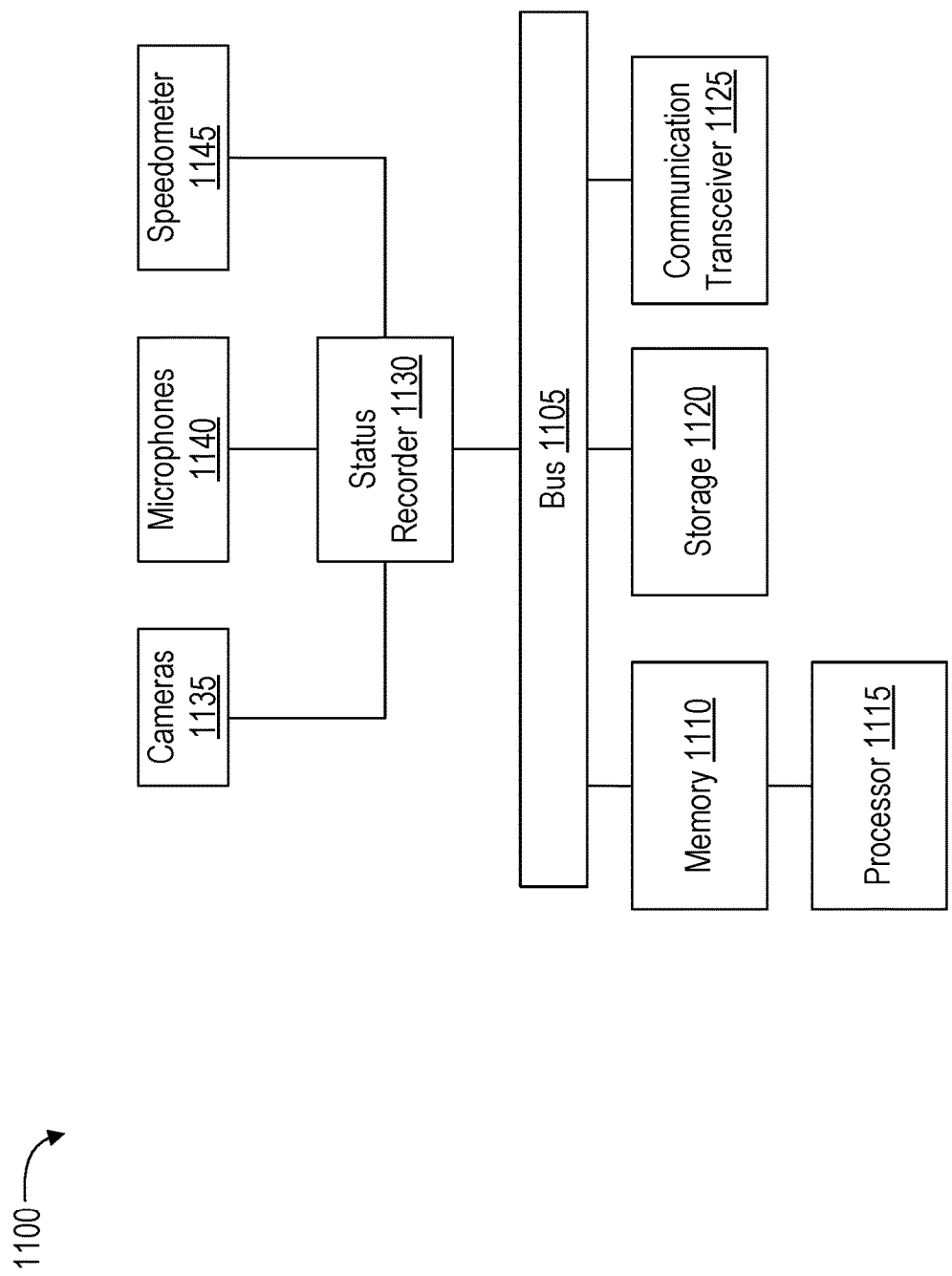
FIG. 11 is a schematic of an embodiment of a computer system that may be implemented to carry out the disclosed subject matter.

Referring to FIG. 11, FIG. 11 is a schematic of an embodiment of a computer system 1100 that may be implemented to carry out the disclosed subject matter. Variations of the computer system 1100 may be present in the recording server 104, client device 106, and status controller 128. A bus 1105 may connect the various components of the computer system 1100. The bus 1105 may be connected to a memory 1110, which stores data that is being transmitted to the various parts of the computer system 1100 through the bus 1105. Various types of memory 1110 may be random access memory ("RAM") and read only memory ("ROM"). The memory 1110 may transmit instructions to the processor 1115 to be executed.

The processor 1115 may process instructions that are transmitted to the processor 1115 from the memory 1110. Executed instructions may be transmitted from the memory 1110 to the various components of the computer system 1100. Various types of processors 1115 may be central processing units ("CPUs"), graphics processing units ("GPUs"), field programmable gate arrays ("FPGAs"), complex programming logic devices ("CPLDs"), and application specific integrated circuits ("ASICs"). The processor 1115 may execute instructions that are passed to the processor 1115 by the client user.

The computer system 1100 may include a storage 1120 that holds data for indefinite periods of time. The storage 1120 may continue to hold data even when the computer system 1100 is powered down. Various types of storage 1120 are magnetic tape drives, solid state drives, and flash drives. The storage 1120 may be used to store status information in the recording server 104. The communication component 1125 may transmit data from the memory 1110 to and from other computer systems. For example, a communication component 1125 may connect the computer system 1100 to the internet. Alternatively, the communication component 1125 may comprise an antenna that is configured to transmit and receive data. In various embodiments, the communication component 1125 may be a Bluetooth antenna, a WIFI antenna, or the like.

The status recorder 1130 may collect status information from one or more status collection components of a vehicle 108. The status collection components may include cameras 1135, microphones 1140, and a speedometer 1145. The cameras 1135 may collect image data from the interior and exterior of the vehicle 108. The camera 1135 image may be transmitted to the status recorder 1130 whereby a time field is appended to the image. In an exemplary embodiment, the camera image may be transmitted through the bus 1105 to the memory 1110 and then to the storage 1120. Similarly, audio recordings from the microphones 1140 may be recorded by the status recorder 1130 whereby a time field is appended to the audio recording. Likewise, speed data may be measured by the speedometer 1145. The various statuses may be stored in the storage 1120 whereby they may be retrieved at the request of the client user.

The various embodiments disclosed herein are intended to be examples of the disclosed subject matter. The embodiments are not meant to limit the disclosed subject matter in any way. The scope of the disclosed subject matter should instead be limited by the appended claims.

The invention claimed is:

1. A method for implementing an automobile status recorder, the method comprising:
   collecting, with one or more sensors, one or more statuses of a vehicle;
   creating a time field for each of the one or more statuses;
   storing the one or more statuses in a storage medium that is configured to retrieve statuses based on a time range, the one or more statuses comprise positions and actions of one or more passengers inside the vehicle, the positions of the one or more passengers are determined responsive to camera image data from the one or more sensors, the actions of the one or more passengers are determined using audio from the vehicle;
   determining a malfunction in the vehicle based on the one or more statuses;
   determining that a driver's hand struggles abnormally with a steering wheel;
   correlating the malfunction in the vehicle to the driver's hands;
   generating a notification when the one or more statuses meet a condition; and
   transmitting the notification to a mobile device, the notification comprising a live stream of data comprising the one or more statuses.

2. The method of claim 1, wherein the one or more statuses comprise a global positioning system (GPS) location of the vehicle;
   wherein the condition comprises the location of the vehicle;
   further comprising receiving a GPS location of the mobile device;
   wherein the condition comprises a relationship between the location of the vehicle and the location of the mobile device;
   wherein the relationship between the location of the vehicle and the location of the mobile device further comprises a geographic area.

3. The method of claim 1, further comprising receiving a selection from the mobile device of a geographic area; and
   wherein the condition comprises a relationship between the geographic area and the location of the vehicle.

4. The method of claim 3, further comprising receiving from the mobile device a selection of a condition;
   wherein the condition sets separate thresholds for inside the geographic area and outside the geographic area.

5. The method of claim 4, further comprising receiving a selection of one or more statuses from the mobile device; and
   wherein the notification comprises the selection of the one or more statuses.

6. The method of claim 1, wherein the one or more statuses comprise a flow of traffic relative to the vehicle; and
   wherein the condition is met when the flow of traffic travels at a different speed from the vehicle.

7. The method of claim 1, further comprising receiving a selection of two geographic areas from the mobile device;
   wherein the one or more statuses comprise a location of the vehicle; and
   wherein the condition comprises the location of the vehicle is inside an area of overlap of the two geographic areas.

8. The method of claim 1, further comprising processing the camera images with a machine learning algorithm to determine the one or more positions of the passengers.

9. The method of claim 1, wherein the actions of the one or more passengers are determined using the audio from interior of the vehicle.

10. The method of claim 8, further comprising determining information not captured by the camera images using the audio from exterior of the vehicle.

11. The method of claim 1, further comprising correlating one or more statuses collected from non-camera sensors to image collected from camera image data from the one or more sensors.

12. The method of claim 11, wherein the actions of the one or more passenger determined using audio from the vehicle are correlated to the camera image data.

13. The method of claim 11, wherein an angle of a steering wheel is correlated to camera image data.

14. An automobile status recorder, the automobile status recorder comprising:
    one or more sensors, in a vehicle, that are configured to continually record one or more statuses of the vehicle;
    a storage medium that is configured to store the one or more statuses;
    a computer that is configured to retrieve the one or more recorded statuses based on a time range, the one or more statuses comprise positions and actions of one or more passengers inside the vehicle, the positions are determined responsive to camera image data from the one or more sensors,-the actions of the one or more passengers are determined using audio from the vehicle;
    wherein the computer is configured to:
       determine a malfunction in the vehicle based on the one or more statuses;
       determine that a driver's hand struggles abnormally with a steering wheel;
       correlate the malfunction in the vehicle to the driver's hands;
       generate a notification when the one or more statuses meet a condition; and
    transmit the notification to a mobile device, the notification comprising a live stream of data comprising the one or more statuses.

15. The automobile status recorder of claim 14, wherein the computer is configured to receive a selection from the mobile device; and
    wherein the selection comprises one or more thresholds to meet the condition.

16. The automobile status recorder of claim 15, wherein the one or more statuses comprise a global positioning system (GPS) location of the vehicle;
    wherein the one or more thresholds comprise one or more location selections to the GPS location; and
    wherein the one or more location selections comprise a geographic area.

17. A non-transitory computer-readable medium having data stored therein representing a software executable by a computer, the software comprising instructions that, when executed, cause the computer to perform:
    collecting, with one or more sensors, one or more statuses, of a vehicle;

storing the one or more statuses in a storage medium that is configured to retrieve statuses, the one or more statuses comprise positions and actions of one or more passengers inside the vehicle, the positions are determined responsive to camera image data from the one or more sensors, the actions of the one or more passengers are determined using audio from the vehicle;

determining a malfunction in the vehicle based on the one or more statuses;

determining that a driver's hand struggles abnormally with a steering wheel;

correlating the malfunction in the vehicle to the driver's hands;

receiving from a mobile device, a selection comprising a threshold for a condition;

generating a notification if the one or more statuses meet the threshold; and transmitting the notification to the mobile device, the notification comprising a live tream of data comprising the one or more statuses.

18. The non-transitory computer-readable medium of claim 17, further comprising receiving a location of the mobile device;

wherein the one or more statuses comprise a global positioning system (GPS) location of the vehicle; and wherein the threshold for the condition comprises a proximity of the mobile device to the vehicle.

19. The non-transitory computer-readable medium of claim 17, wherein the selection further comprises a geographic area;

wherein the one or more statuses comprise a global positioning system (GPS) location of the vehicle;

wherein the threshold for the condition comprises the GPS location being within the geographic area; and wherein the condition sets separate thresholds for inside the geographic area and outside the geographic area.

* * * * *